US005257445A

United States Patent [19]

Mayberry

[11] Patent Number: 5,257,445

[45] Date of Patent: Nov. 2, 1993

[54] BEARING AND PILLOW-BLOCK PULLER

[76] Inventor: George M. Mayberry, 1584 Hwy. 84, Grayson, Ga. 30221

[21] Appl. No.: 889,803

[22] Filed: May 29, 1992

[51] Int. Cl.[5] .............................................. B23P 19/04

[52] U.S. Cl. ...................................................... 29/261

[58] Field of Search .................................. 29/258-263, 29/265-266

[56] References Cited

U.S. PATENT DOCUMENTS

| | | | |
|---|---|---|---|
| 1,468,334 | 9/1923 | Thomason | 29/260 |
| 1,607,957 | 11/1926 | Koehler | 29/261 |
| 1,620,211 | 3/1927 | Jerabek | 29/261 |
| 2,568,998 | 9/1951 | Fletcher | 29/266 |
| 2,618,052 | 11/1952 | Skaggs | 29/266 |
| 2,821,776 | 6/1954 | Keister . | |
| 2,821,777 | 2/1958 | Keister | 29/259 |
| 3,200,483 | 8/1965 | Menegoni . | |
| 3,462,988 | 8/1969 | Tudor et al. | 29/264 |
| 3,689,978 | 9/1972 | Kelso . | |
| 3,909,916 | 10/1975 | Neff et al. . | |
| 3,986,242 | 10/1976 | Kerr | 29/261 |
| 4,463,489 | 8/1984 | James | 29/261 |
| 4,502,197 | 3/1985 | Harder | 29/259 |
| 4,672,731 | 6/1987 | Taylor | 29/259 |

*Primary Examiner*—Robert C. Watson
*Attorney, Agent, or Firm*—James A. Hinkle

[57] ABSTRACT

A bearing and pillow-block puller has a handle (43, 45, 50) attachable to a threaded base (3). Proximal ends of optionally puller rods (18), hook arms (35), puller chains (31) or puller straps (39) are attachable to tandem plates (5) on the threaded base (3). Distal ends of the puller rods (18), hook arms (35), puller chain (31) or puller straps (39) are attachable to a yoke plate (21) that is adaptable with race adapter plates (37) for attachment to different sizes of bearings and pillow blocks (24, 26). A puller point (13) of a puller bolt (1) is buttressed against ends (30) of a shaft (23) or against adapters (53, 56) at ends of shafts (23). The bearings or pillow blocks (24, 26) are pulled from the shafts (23) by pulling the bearings or pillow blocks (24) from the threaded base (3).

5 Claims, 7 Drawing Sheets

BEARING AND PILLOW-BLOCK PULLER

BACKGROUND OF THE INVENTION

1. Field of the Invention

The present invention relates generally to the field of tools commonly known as pullers having machine-threaded rods which are rotated in a proximal base in opposition to a distal surface in order to disengage tightly-fit components of machinery.

2. Description of Prior Art

Most previous pullers have been constructed for general purposes of pulling machinery wheels and bearings apart. Some have been designed for specific types of component separation in order to compensate for a bulky, inconvenient and inaccurate nature of general-purpose wheel pullers. This invention is for safe, accurate and fast separation of a wide variety of bearings and pillow blocks from shafts. It is particularly suitable for separating bearings and pillow blocks from shafts of air conditioners, compressors, evaporators and fans.

Examples of different but pertinent prior art are described in the following U.S. patents.

| U.S. Pat. No. | DATE | NAME | CLASSIFICATION |
|---|---|---|---|
| 3,909,916 | Oct. 7, 1975 | Neff et al. | 29/235 |
| 3,689,978 | Sep. 12, 1972 | Kelso | 29/258 |
| 3,200,483 | Aug. 17, 1965 | Menegoni | 29/259 |
| 2,821,776 | Feb. 4, 1958 | Keister | 29/259 |

The Neff et al patent described a puller specifically for removing shaft seals from engines. Self-tapping threads on ends of bolts in a plate were threadable into a seal support sleeve. Then a puller bolt in the plate was turned against an end of a shaft inside of the bearing to pull the bearing support sleeve out in opposition to the shaft in the bearing. This was suitable for some types of engine components but was not positional for pulling shafts and bearings of air conditioners and fans apart.

Kelso taught a type of yoke with slotted arms extended radially to position pulling hangers. This was appropriate for pulling wheels and shafts apart in unconfined conditions associated with some types of machinery. But it could not be manipulated by hand or positioned to be operated effectively and conveniently in the confined conditions of air conditioner machinery in structures where it was installed.

The Mengoni patent, even more than the Neff patent, was too bulky and unworkable for the use conditions of air conditioning equipment. It had a puller base plate that prevented access to components of air conditioner and fan machinery.

The Keister device was particularly universal for wheel and shaft pulling but not manageable or positional in effective pulling relationship to bearings and shafts of installed air conditioner and fan machinery.

SUMMARY OF THE INVENTION

In accordance with the present invention, it is contemplated that one objective of this invention is to provide a puller tool with a handle to position it in effectively controllable pulling relationship to machinery installed in buildings, vehicles and various use conditions.

Another objective is to provide a puller with narrow components that can be positioned in confined work spaces.

Another objective is to provide a puller with high adaptability of attachment to bearings and shafts.

Another objective is to provide a puller with high centering accuracy to prevent damage to machine components being separated.

An overall objective resulting from the general nature of this invention is to provide a puller that is fast, convenient and cost-effective for removal of bearings and pillow blocks from shafts in their installed use conditions.

This invention accomplishes the above and other objectives with a bearing and pillow-block puller that has a handle attachable to a threaded base. Proximal ends of optionally puller rods, hook arms, puller chains or puller straps are attachable to the threaded base. Distal ends of the puller rods, hook arms, puller chains or puller straps are attachable to yoke plates that are adaptable with race adapter plates for attachment to bearings and pillow blocks. A point of a puller bolt is buttressed against ends of shafts or against adapters on ends of shafts in the bearings or pillow blocks. The bearings or pillow blocks are moved on the shafts by applying pressure on a threaded bolt against the end of the shaft to bias a plate against the bottom of the bearing to thereby move the bearing along the shaft and to ultimately remove same.

Other objects, advantages and capabilities of the invention will become apparent from the following description taken in conjunction with the accompanying drawings showing preferred embodiments of the invention.

DESCRIPTION OF THE PREFERRED EMBODIMENTS

Figure 1:
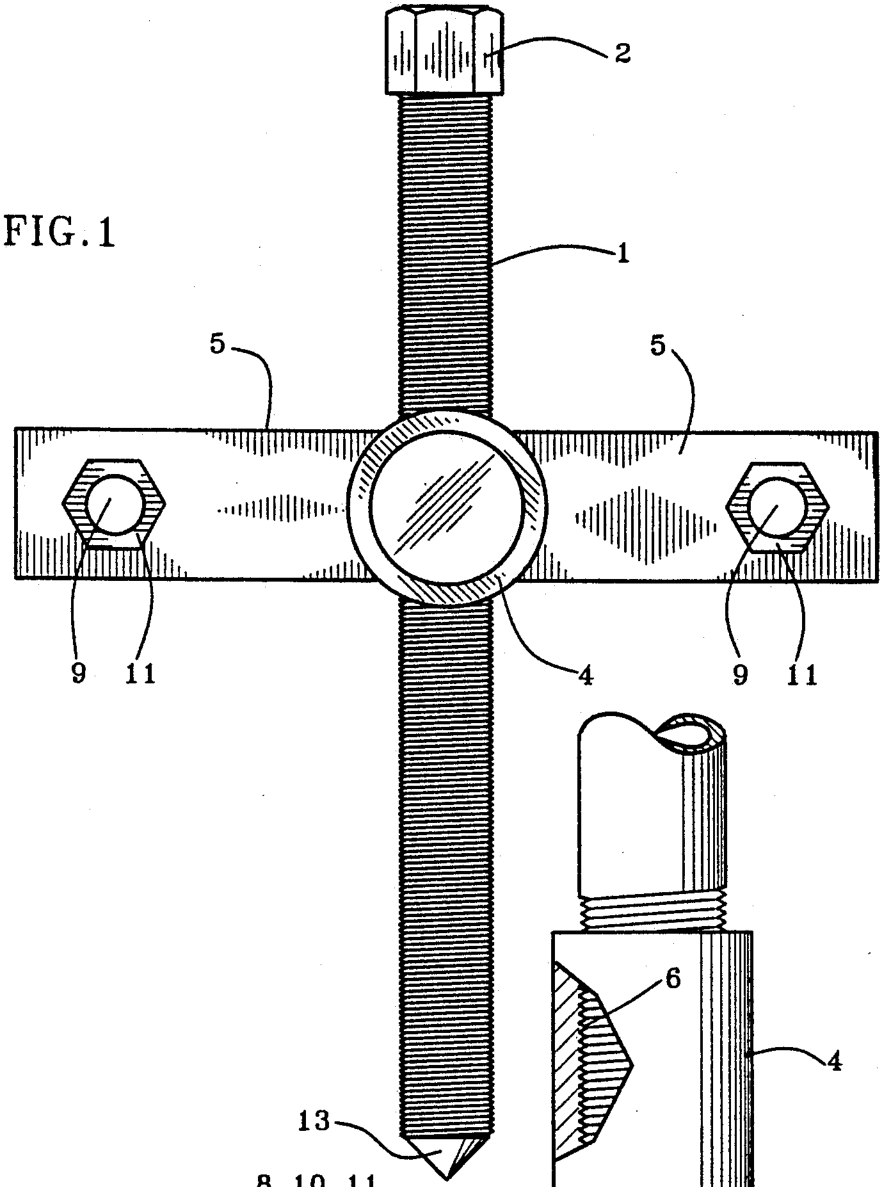
FIG. 1 is a side elevation view of an embodiment of this invention having a handle-attachment means at a side of a pair of two tandem plates.

Referring to the drawings wherein like reference numerals designate corresponding parts throughout the several figures, a puller bolt 1, having a wrench head 2, is screwed into a puller base 3 having a handle-attachment means 4 and tandem plates 5 extended from the puller base 3 perpendicularly to a common axis of the puller bolt 1 and the puller base 3. The same as for prior pullers, threading on the bolt 1 is extra-fine size in order to maximize mechanical advantage and thread strength per linear distance. The bolt head 2 is preferably hexagonal to allow use of a ratchet wrench. In this embodiment, tandem plates 5 are extended from opposite sides of the puller base 3.

A major advantage of this invention is making it possible to hold a puller and its load-attachment means straight while being used. Holding puller tools straight is particularly a problem when machinery components to be pulled apart are in confined conditions. When confinement of space conditions is at one side of machinery to be separated, it is necessary to use two oppositely-disposed load-attachment means 5. This prevents a three-point triangular load-attachment means on a puller base 3. Pulling conditions are so confined that in-place disengagement of nearly all types of air conditioning, heat-exchanger, evaporator, fan, motor and related machinery is not possible without destroying the machinery. In more open conditions also, where three-point load attachment is possible, the three-point pullers cannot be held straight while being used because the machinery, although unconfined, is almost always horizontal. This horizontal attitude causes pullers to fall to one side and disrupt integrity of three-point contact without a handle means 4 provided by this invention. Consequently, nearly all machinery requiring disengagement must be removed for major repair and servicing. Commercial and industrial facilities such as restaurants, hospitals, workplaces and stores, for example, would benefit greatly by on-site air conditioning and fan service made possible with this invention. Cost of removal and shop repair is so high that it is nearly always only marginally competitive with new replacement. This invention, however, is making an entire type of low-cost repair service possible. It can be used widely with huge cost-savings for not only air conditioning machinery but also for nearly all other types of machinery shaft disengagement from bearings.

Figure 2:
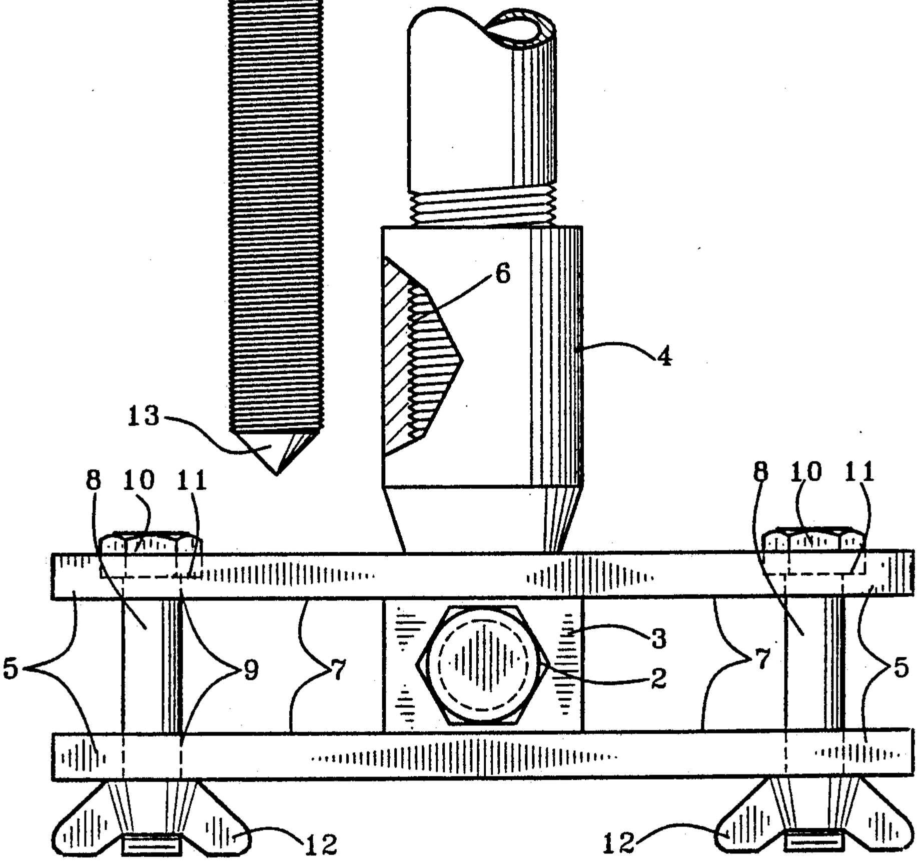
FIG. 2 is a top view of the FIG. 1 illustration with attachment bolts inserted.

Referring still further to FIGS. 1 and 2, a basic handle-attachment means 4 can have internal threading 6. The tandem plates 5 have parallel surfaces 7 between which attachment bolts 8 are extendable from tandem-plate orifices 9. Attachment-bolt heads 10 can be embedded into bolt-head cavities 11 that prevent turning of the attachment bolts 8 when fastener nuts such as convenient wing nuts 12 are rotated. For some embodiments of this invention the attachment bolts 8 are not used. Then the tandem-plate orifices 9 and bolt-head cavities 11 remain open as in FIGS. 1 and 3. When the puller bolt 1 is rotated at wrench head 2, a puller point 13 on the puller bolt 1 is pressured against a piece of machinery being disengaged from another piece of machinery attached to the tandem plates 5 with means provided by this invention.

Figure 3:
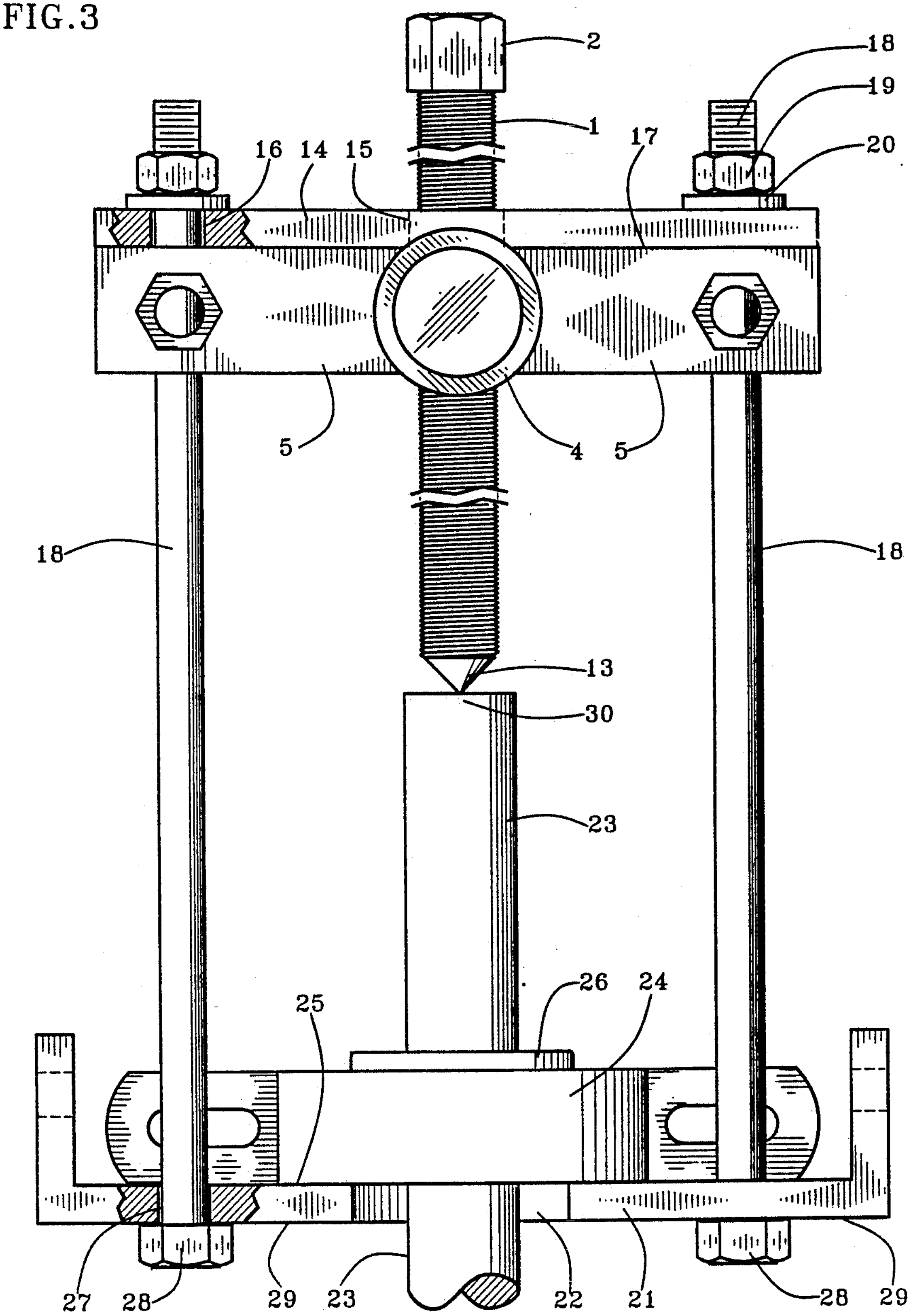
FIG. 3 is a cutaway side view of an embodiment of this invention having proximal ends of puller rods as a pulling means attached to a puller rod plate on top of oppositely-disposed tandem plates. Distal ends of the puller rods are attached to a puller yoke at a distal end of a bearing housing.
Figure 13:
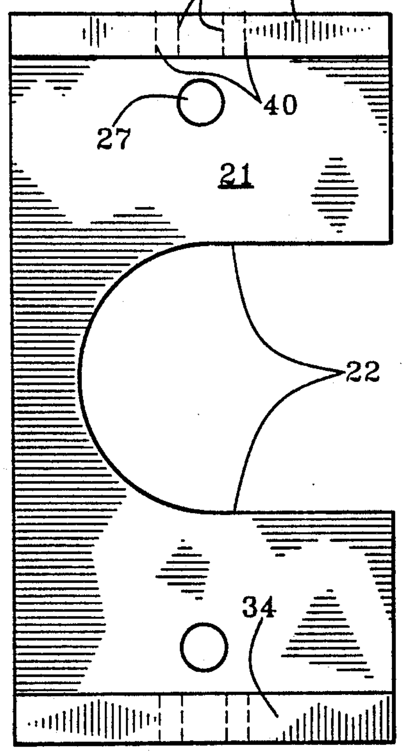
FIG. 13 is a top view of a puller yoke.

Referring now to FIG. 3, in a puller-rod embodiment of this invention, a puller-rod plate 14 having a puller-bolt orifice 15 and puller-rod orifices 16 is positional on proximal edges 17 of the tandem plates 5. Puller rods 18 are attached to the puller-rod plate 14 with puller-rod nuts 19 which are rotated on bearing washers 20. A yoke plate 21, shown in side view in FIGS. 3, 4 and 7 and in a top view in FIG. 13, is provided with a yoke groove 22 into which a typical shaft 23 is inserted for removal from a typical bearing 24. In this illustration, a proximal side 25 of yoke plate 21 is positioned directly against a distal side of the typical bearing 24 because a distal side of an inside bearing race 26 is flush linearly with outside housing of the bearing 24. The puller rod 18 is inserted through a puller-rod yoke orifice 27 at each side of the yoke groove 22. A puller-rod head 28, or other abutment on puller rod 18, is buttressed against a distal side 29 of the yoke plate 21. Rotating puller bolt 1 in a direction to cause puller point 13 to be pressured against a proximal end 30 of a typical shaft 23 causes the bearing 24 to be pulled off of shaft 23. Tightness of fit with typical press-fitting of race 26 to shaft 23 which requires press-pulling for separation is necessary in machinery technology. Until now, however, nearly all press-pulling has required conventional in-shop pullers. This invention makes on-site pulling possible at far lower cost and lower down-time of machinery for repair requiring press-pulling of components.

Figure 4:
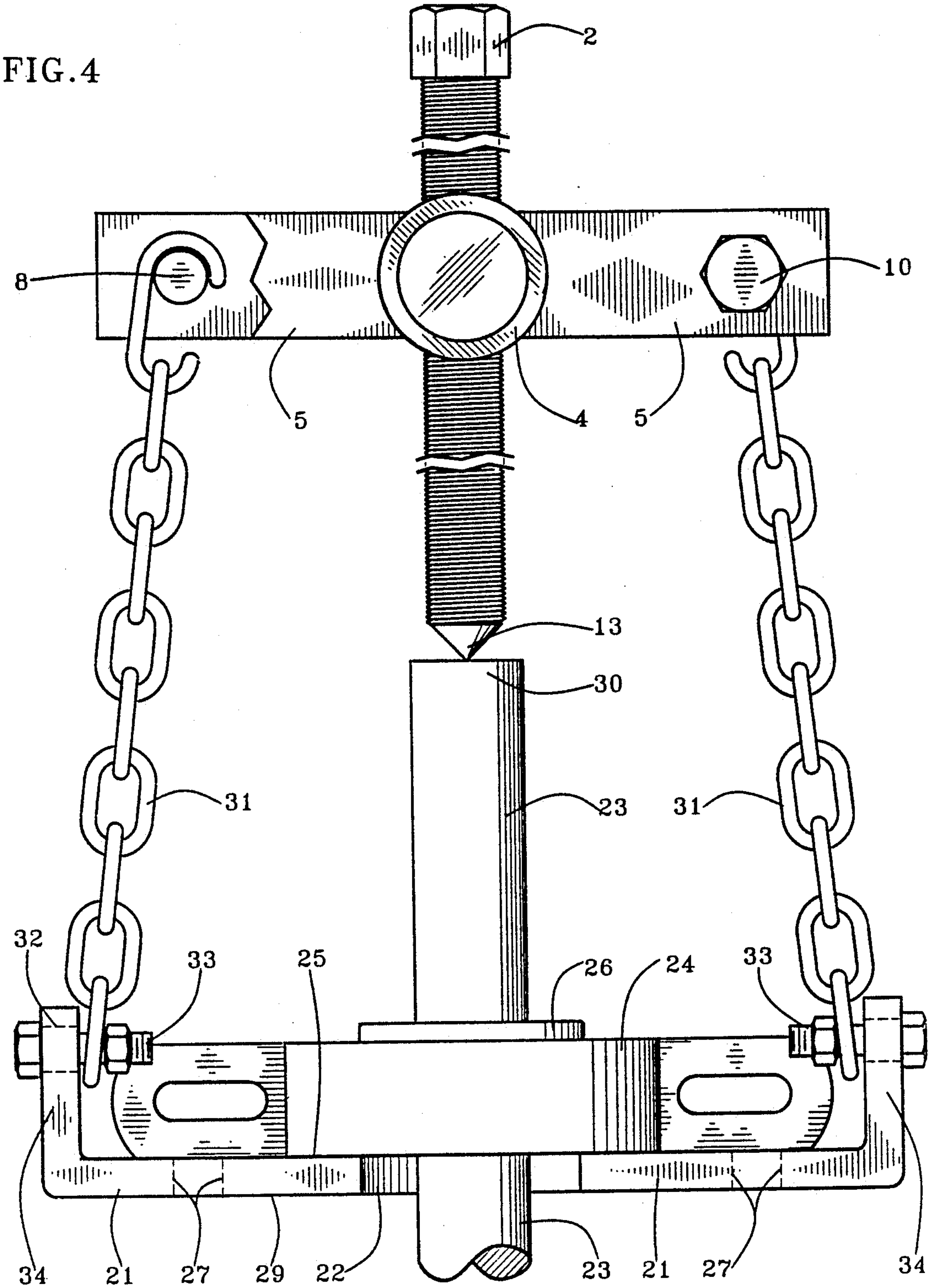
FIG. 4 is a side view of this invention with puller chains as the pulling means.

Referring to FIG. 4, in a puller-chain embodiment of this invention, puller chain 31 is attached to puller yoke 21 at a line-attachment orifice 32 at each side of the yoke groove 22. A fastener means insertable in attachment orifice 32 can be a hook, a clevis pin of some form or other fastener means represented by a chain bolt 33. Yoke flanges 34 can be provided at edges of puller yoke 21 for convenience of positioning attachment orifices 32. Positioning the attachment orifices centrally on the flanges 34 at a proximal side 25 of the yoke plate 21 centers pulling of the puller yoke 21 straight against a typical bearing 24. A proximal end of the puller chain 31 is attachable variously to tandem plates 5 as represented by attachment-bolt heads 10 of attachment bolts 8 and a chain hook. Other aspects of the puller-chain embodiment of this invention are similar to the puller-rod embodiment described in relation to FIG. 3. A flexible attachment means such as puller chain 31 is important for some use-conditions. It is part of a versatility of this invention which makes on-site press-pulling achievable.

Figure 5:
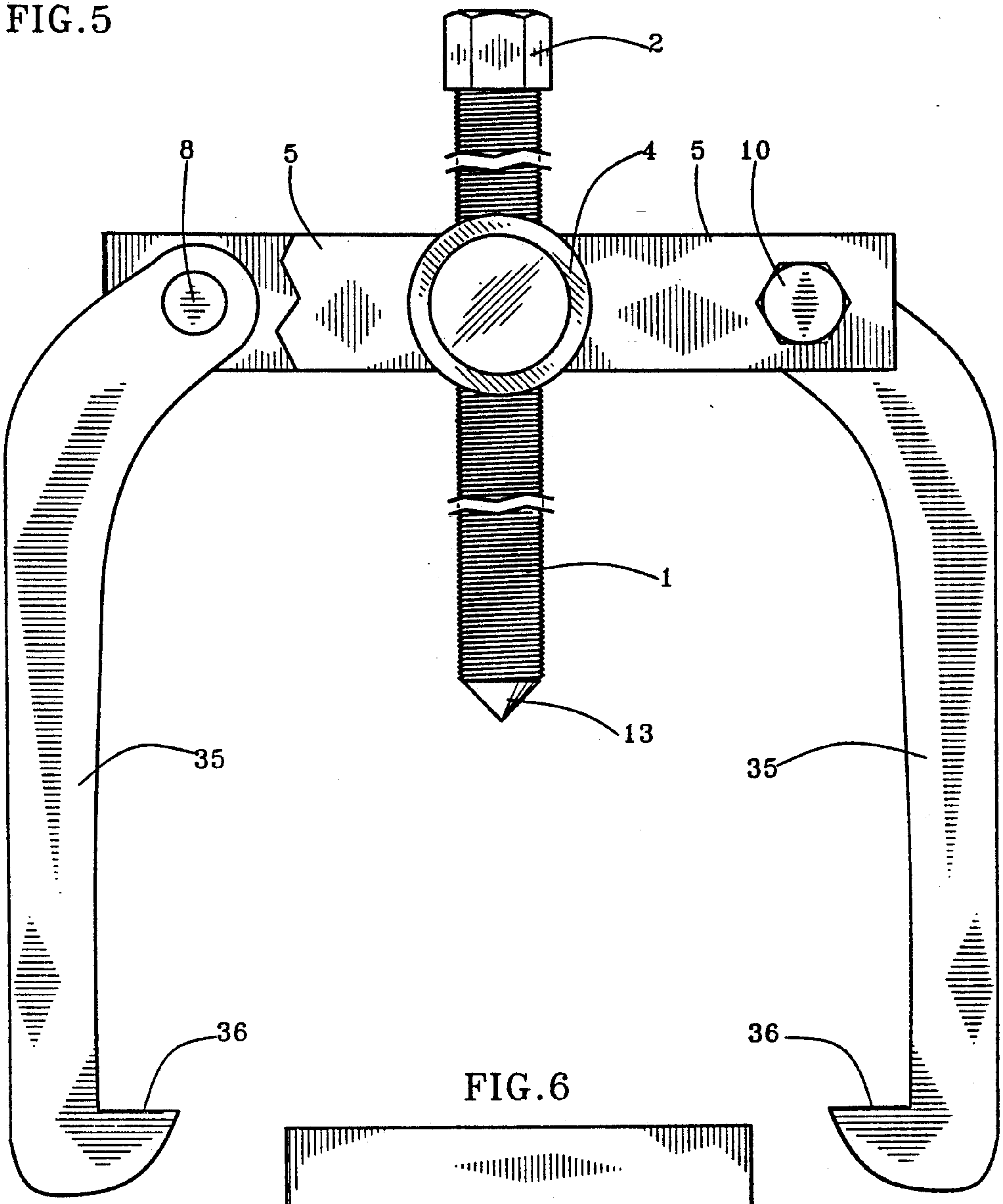
FIG. 5 is a side view of this invention with puller hooks as the pulling means.

Referring to FIG. 5, in a puller-hook embodiment of this invention, puller-hook arms 35 are attachable to tandem plates 5 with attachment bolts 8 represented by attachment-bolt heads 10 and shown in greater detail in FIGS. 2 and 8–12. The same attachment bolts 8 can be used for all load-attachment means except puller rods 18. Puller-hook arms 35 with puller hooks 36 are used for only a small portion of effective pulling made possible with this invention. They would be little more useful than conventional puller hooks, which they resemble, except for their being attachable to tandem plates 5 which ar useable also for attachment of puller rods 18 and flexible pulling means such as puller chain 31 shown in FIG. 4 and puller strap shown in FIG. 7. Versatility of this invention requires occasional use of puller hooks 36. Making puller hooks 36 available for portions of press-pulling procedures with more effective press-pulling using puller rods 18 and flexible puller means in procedural steps is a utility of this invention.

Figure 6:
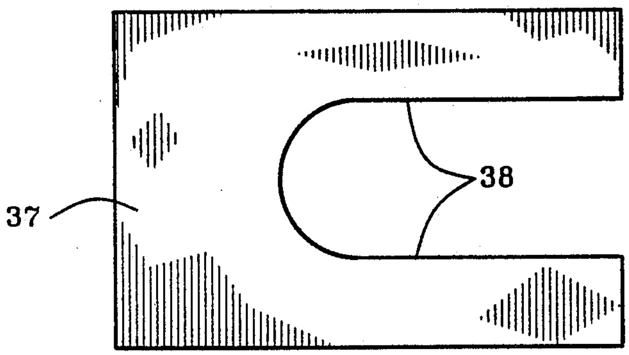
FIG. 6 is a top view of an adapter plate insertable between a puller yoke and a bearing race to compensate for differences in diameters of items to be disengaged by pulling with this invention.

Referring to FIG. 6, a race adapter plate 37 has a U-shaped channel 38. The race adapter plate 37 is positional between the proximal side 25 of puller yoke 21 and desired portions of machinery in the press-pulling process. In effect, it adapts the size of the yoke groove 22 to the size of the U-shaped channel 38 in the race adapter plate 37.

Figure 7:
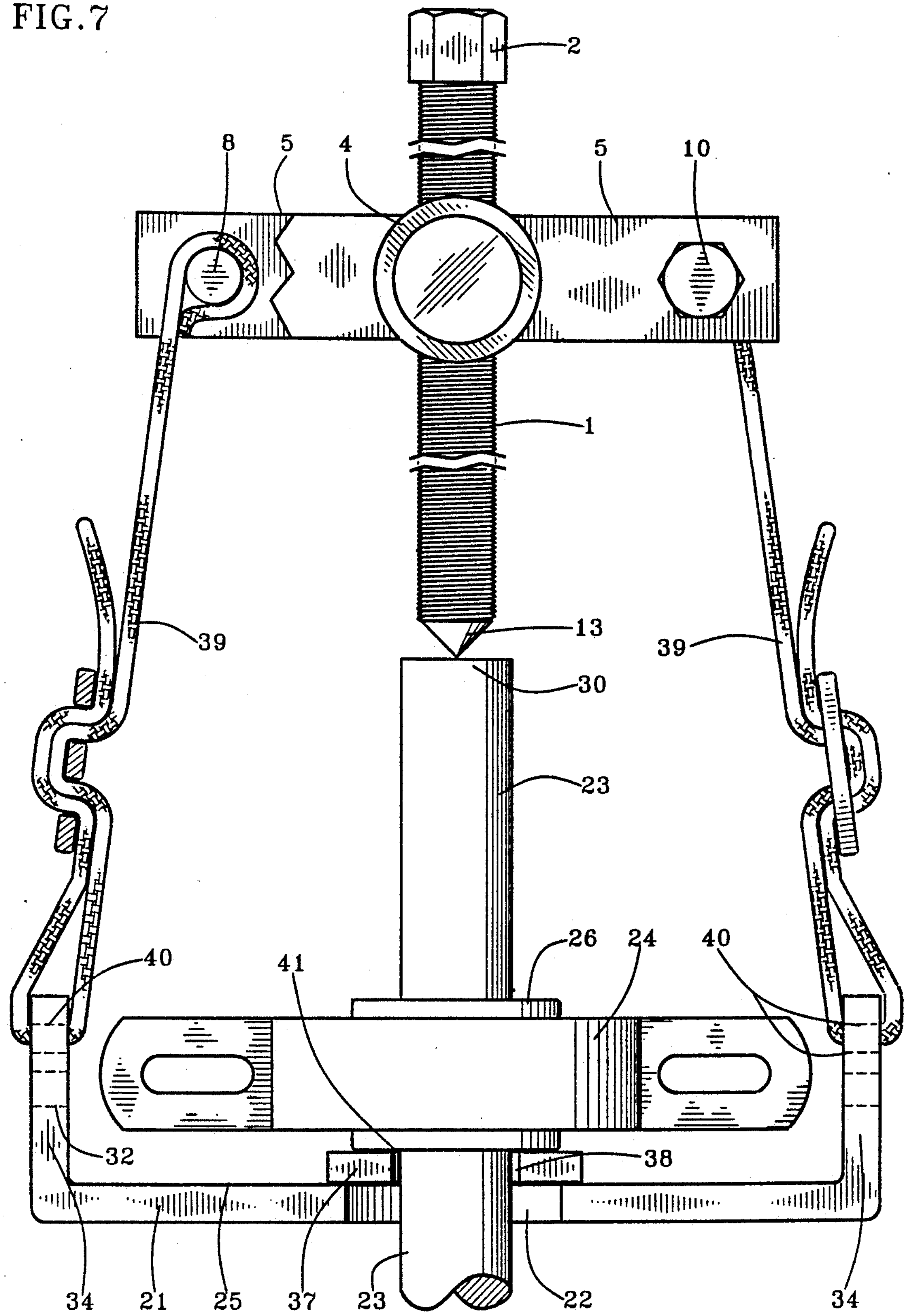
FIG. 7 is a side view of this invention with puller straps as the pulling means and having an adapter plate positioned between a puller yoke and a bearing housing to provide pulling contact against an internal bearing race instead of an external bearing race for pulling the bearing housing off of a machine shaft.

Referring to FIG. 7, in a puller-strap embodiment of this invention, a puller strap 39 is attachable to the yoke plate 21 at a line-attachment orifice 40 on a yoke flange 34 at each side of the yoke groove 22. Other aspects of this embodiment are similar to the puller-chain illustration described in relation to FIG. 4. A simple hook attached to the puller strap 39 can be used instead of inserting the puller strap 39 through line-attachment orifice 40 each time puller strap 39 is attached to yoke plate 21. Likewise, attachment bolts 8 represented by attachment bolt head 10 and shown in FIGS. 2 and 8–12, can be inserted through a simple hook or a loop in puller strap 37 for attachment of a proximal end of puller strap 39 to tandem plates 5. This and other strap technology are foreseeable as part of this invention.

Illustrated also in FIG. 7, is positioning of the race adapter plate 37 between the proximal side 25 of the yoke plate 21 and a distal end 41 of a typical inside race or other machinery component to be removed from the typical shaft 23. Positioning the proximal side 25 of the yoke plate 21 immediately against an outside race of a typical bearing 24 would distort the bearing and likely destroy an anchoring base on the bearing 24. But this is what would happen if the inside race 26 entered the yoke groove 22 in the pulling process. Hence a race adapter plate 37 in various sizes for particular sizes of inside bearing races 26 and other machinery components. The U-shaped channel 38 in the race adapter 37 fills a gap between an inside periphery of the puller groove 22 and an inside periphery of the U-shaped channel 38.

Figure 8:
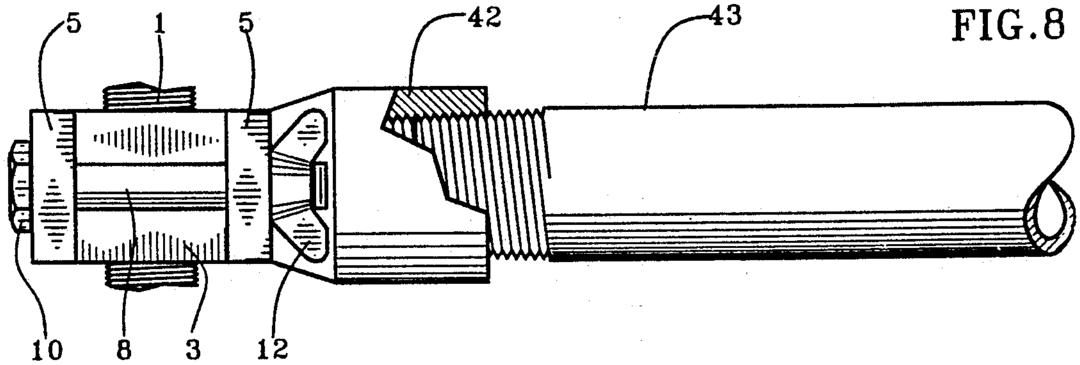
FIG. 8 is a cutaway side view of a taper-threaded handle-attachment means on a side of tandem plates at opposite sides of a puller base and puller bolt.
Figure 9:
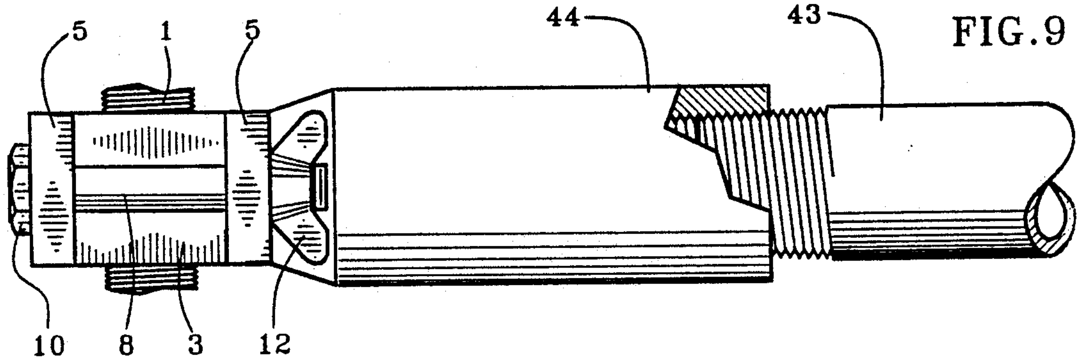
FIG. 9 is a cutaway side view of a taper-threaded handle-attachment means extended as a short handle from a side of tandem plates at opposite sides of a puller base and puller bolt.

Referring to FIGS. 8–11, a variety of the basic handle-attachment means 4 shown in FIG. 2 are provided. In FIG. 8 is an internally taper-threaded sleeve 42 with an externally taper-threaded handle 43 screwable into it. In FIG. 9, the internally taper-threaded sleeve 42 of FIG. 8 is extended into an internally taper-threaded short handle 44 into which the same externally taper-threaded handle 43 is screwable. Taper-threading attachment of handles 43 is very effective. They are sturdy and reliable. However, a more sturdy and less expensive attachment means for high-volume production is a bolt-cone construction illustrated in FIG. 10.

Figure 10:
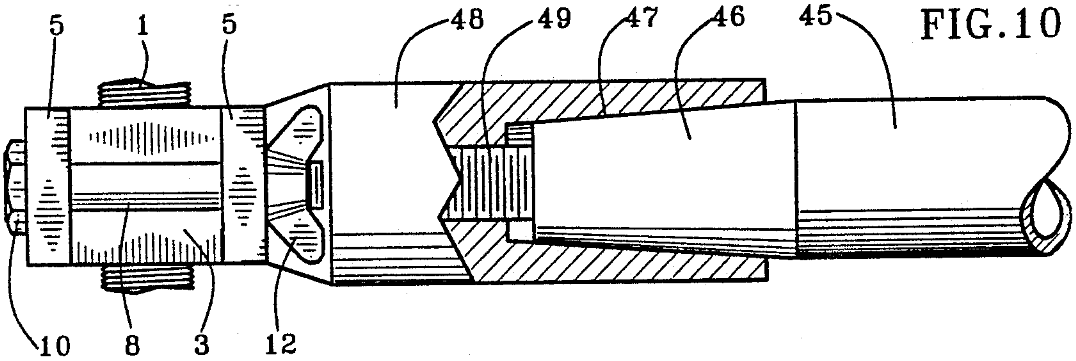
FIG. 10 is a cutaway side view of a bolt-cone handle-attachment means extended as a short handle from a side of tandem plates at opposite sides of a puller base and puller bolt.

FIG. 10 shows a coned handle 45 with a truncated cone 46 inserted in a reciprocally matching internally coned sleeve 47 extended selectively as a coned-sleeve short handle 48. A bolt means 49 can be either attached to the short handle 48 or to the coned handle 45 and screwed into whichever of the two members does not have the bolt means 49 attached to it. Having the bolt means 49 attached to the short handle 48 and screwable into the coned handle 45 is easier to use and less likely to be damaged in use conditions. It is preferred to having the bolt means attached to the coned handle 45 and screwable into the short handle 48.

Figure 11:
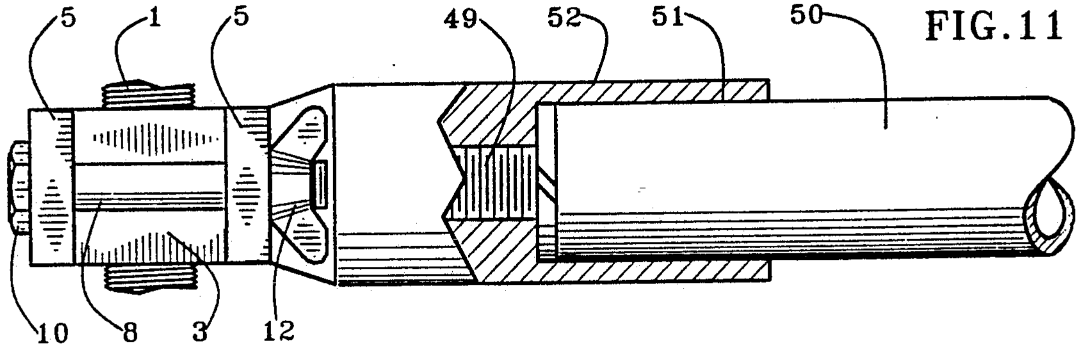
FIG. 11 is a cutaway side view of a bolt-sleeve handle-attachment means extended as a short handle from a side of tandem plates at opposite sides of a puller base and puller bolt.

FIG. 11 shows a straight handle 50 having a contact outside section in slidable contact with an inside periphery of an internal straight sleeve 51 extended selectively as a short un-coned handle 52. The bolt means 49 has the same working relationship as described in relation to FIG. 10.

The short handles 44, 48 and 52 are for convenient and quick transport and use for light work under more favorable conditions and for initial set up before attaching a long handle 43, 45 or 50. They are also more reliable and stable, particularly the FIG. 10 embodiment. For all types of handles, a sectioned pipe can be used for added rigidity in positioning the puller base 3 concentrically with a typical shaft 23 from which a typical bearing 24 is to be press-pulled with this invention. However, the use of a permanent short handle 44, 48 or 52 decreases need for different lengths of long handles 43, 45 and 50.

Figure 12:
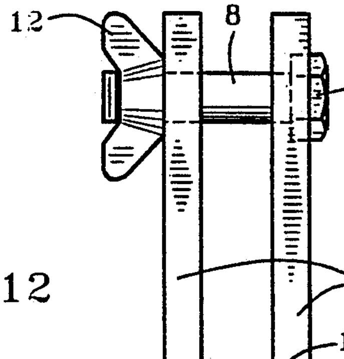
FIG. 12 is a cutaway top view of a bolt-cone handle-attachment means extended as a short handle from a side of a puller base having three tandem plates.
Figure 12:
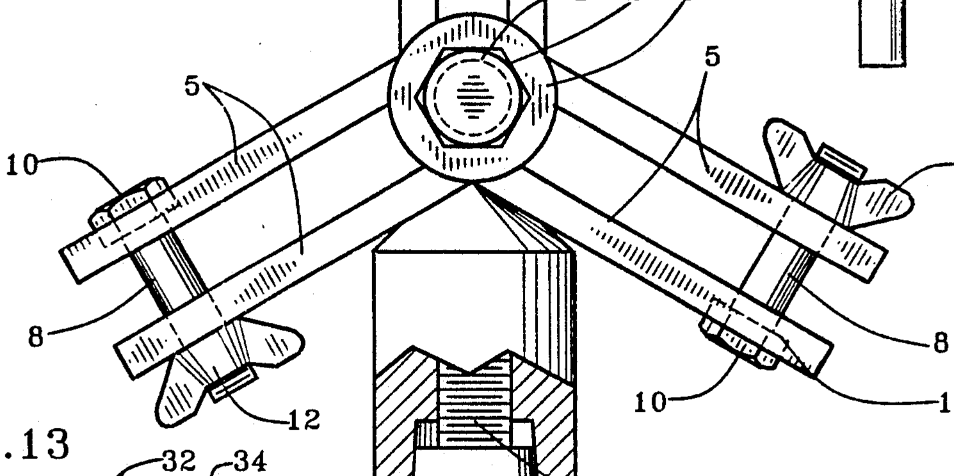
Figure 12:
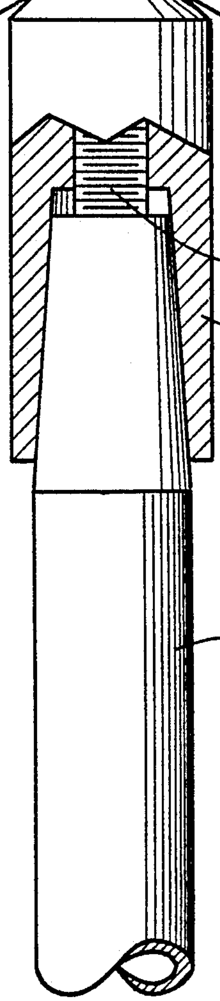

Referring to FIG. 12, an embodiment of this invention having a plurality of three tandem plates 5 extended from a puller base 3 is shown. A coned-sleeve short handle 48 with a coned handle 45 inserted is shown in representation of all types of handles and handle-attachment means attachable to a puller base having a plurality of more than two tandem plates.

Referring to FIG. 13, a yoke plate 21 is shown from a proximal side 25 or top view. The puller-rod yoke orifice 27, the line-attachment orifice 32 and the center of the yoke groove 22 are shown in-line to aid straight pulling relationship of the yoke plate 21.

Figure 14:
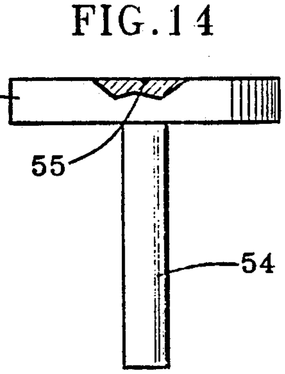
FIG. 14 is a cutaway side view of a shaft insert for removing bearings from hollow shafts.

Referring to FIG. 14, a hollow-shaft insert 53 has a stem 54 insertable into shafts 23 which are sometimes hollow and a dimple 55 to receive a puller point 13. It can be round or rectangular.

Figure 15:
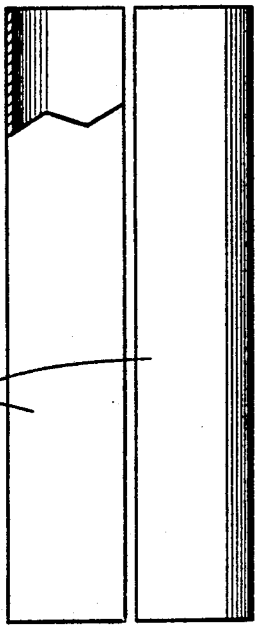
FIG. 15 is a cutaway side view of half-cylinder spacers for disengaging particular types of machinery.

Referring to FIG. 15, a pair of two semi-cylindrical spacers 56 can be provided for portions of a process of removing particular types of shafts 23 from bearings 24.

Various modifications may be made of the invention without departing from the scope thereof and it is desired, therefore, that only such limitations shall be placed thereon as are imposed by the prior art and which are set forth in the appended claims.

What is claimed is:

1. A bearing and pillow-block puller having:

a puller base with internal threading;

a handle-attachment means on the puller base;

a puller bolt being externally threadingly engageable with the internal threading of the puller base;

puller attachment means extended from the puller base, the puller attachment means comprising tandem plates extended radially from opposite sides of the puller base with plane surfaces spaced selectively apart and parallel to a linear axis of the internal threading of the puller base and having at least one attachment bolt positional in a plate orifice with a linear axis perpendicular to the parallel plane surfaces in each of the tandem plates;

multiple puller members having a proximal end and a distal end, the proximal end attachable to the tandem plates at a plate orifice at each side of the internal threading of the puller base;

puller member attachment means attachable to the distal ends of the multiple puller members, the puller member attachment means further comprising a yoke plate having a line-attachment orifice at each side of a yoke groove, the yoke plate being positional at an opposite side of a bearing or pillow block from the puller base; and a race adapter plate having a U-shaped channel positional between the yoke plate and bearings or pillow blocks having a surface area smaller than the yoke groove and the yoke plate.

2. A bearing and pillow block puller as claimed in claim 1, wherein the multiple puller members comprise elongated rigid rods.

3. A bearing and pillow block puller as claimed in claim 1, wherein the multiple puller members comprise a chain.

4. A bearing and pillow block puller as claimed in claim 1, wherein the multiple puller members comprise elongated arms pivoted from the tandem plates and terminating at the distal ends thereof with hook-shaped members.

5. A bearing and pillow block puller as claimed in claim 1, wherein the multiple puller members comprise a flexible strap.

* * * * *